United States Patent
Ketchum et al.

(10) Patent No.: US 10,196,926 B2
(45) Date of Patent: Feb. 5, 2019

(54) LUBRICATING A ROTATING COMPONENT DURING FORWARD AND/OR REVERSE ROTATION

(71) Applicant: United Technologies Corporation, Hartford, CT (US)

(72) Inventors: David A. Ketchum, Willington, CT (US); James T. Thoresen, Glastonbury, CT (US); Denman H. James, Windsor, CT (US); Reade W. James, West Hartford, CT (US); William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 762 days.

(21) Appl. No.: 14/683,824

(22) Filed: Apr. 10, 2015

(65) Prior Publication Data

US 2015/0292359 A1    Oct. 15, 2015

Related U.S. Application Data

(60) Provisional application No. 61/978,525, filed on Apr. 11, 2014.

(51) Int. Cl.
| | | |
|---|---|---|
| *F01D 25/20* | (2006.01) | |
| *F01D 21/00* | (2006.01) | |
| *F02C 7/36* | (2006.01) | |
| *F02C 7/06* | (2006.01) | |

(52) U.S. Cl.
CPC ............ *F01D 21/00* (2013.01); *F01D 25/20* (2013.01); *F02C 7/06* (2013.01); *F02C 7/36* (2013.01); *F05D 2260/40311* (2013.01)

(58) Field of Classification Search
None
See application file for complete search history.

(56) References Cited

U.S. PATENT DOCUMENTS

| | | |
|---|---|---|
| 5,102,379 A | 4/1992 | Pagluica et al. |
| 5,433,674 A | 7/1995 | Sheridan et al. |
| 6,223,616 B1 | 5/2001 | Sheridan |
| 7,377,870 B2 | 5/2008 | Matsushita et al. |
| 7,662,059 B2 | 2/2010 | McCune |
| 7,704,178 B2 * | 4/2010 | Sheridan ................. F01D 25/18 475/159 |
| 8,230,974 B2 * | 7/2012 | Parnin ..................... F01D 25/18 184/6.11 |
| 8,511,435 B2 | 8/2013 | Sheridan et al. |
| 8,562,224 B2 | 10/2013 | Duffy |
| 8,572,943 B1 | 11/2013 | Sheridan |
| 8,651,240 B1 | 2/2014 | Motto |
| 2006/0223664 A1 | 10/2006 | Duong et al. |
| 2008/0006018 A1 * | 1/2008 | Sheridan ................. F01D 25/18 60/39.1 |

* cited by examiner

*Primary Examiner* — Igor Kershteyn
*Assistant Examiner* — Jason Fountain
(74) *Attorney, Agent, or Firm* — O'Shea Getz P.C.

(57) ABSTRACT

An assembly is provided for a turbine engine. This turbine engine assembly includes a rotating component, a turbine engine component and a lubrication system. The lubrication system is adapted to lubricate the turbine engine component where the rotating component rotates a first direction about an axis. The lubrication system is also adapted to lubricate the turbine engine component where the rotating component rotates a second direction about the axis.

18 Claims, 5 Drawing Sheets

LUBRICATING A ROTATING COMPONENT DURING FORWARD AND/OR REVERSE ROTATION

CROSS-REFERENCE TO RELATED APPLICATION

This application claims priority to U.S. Provisional Patent Application No. 61/978,525 filed Apr. 11, 2014, which is hereby incorporated herein by reference in its entirety.

BACKGROUND OF THE INVENTION

1. Technical Field

This disclosure relates generally to lubricating a component of a rotational system such as, for example, a turbine engine.

2. Background Information

A turbine engine typically includes a fan section, a compressor section, a combustor section and a turbine section. Some turbine engines may also each include a gear train, which rotationally couples and transmits torque between a rotor of the turbine section and a rotor of the fan section. Such a gear train may include a plurality of gears and a plurality of journal bearings. The gears are rotatably supported by the bearings, and rotationally couple and transmit torque between the turbine rotor and the fan rotor.

When the turbine engine is powered up, a lubrication system for the turbine engine may lubricate the bearings of the gear train. For example, a forward rotating engine shaft may mechanically drive a pump to direct lubricant from a reservoir to the bearings. Such a mechanically driven pump, however, cannot direct lubricant to the bearings when the engine shaft is rotating in a reverse direction. Rather, the reverse rotating engine shaft may drive the pump to siphon air and/or lubricant from the bearings. Such reverse rotation may occur, for example, where the turbine engine is powered down and wind is blowing into a bypass gas path nozzle of the turbine engine causing the fan rotor to windmill in the reverse direction.

To prevent the unlubricated bearing of the gear train from seizing during reverse rotation, the turbine engine may be configured with a mechanical rotor lock. Such a rotor lock, however, may increase cost and complexity of the turbine engine. In addition, if the rotor lock is mistakenly left unengaged or fails, the unlubricated bearings of the gear train may still be susceptible to seizing.

There is a need in the art for an improved lubrication system for a turbine engine.

SUMMARY OF THE DISCLOSURE

According to an aspect of the invention, an assembly is provided for a turbine engine. This turbine engine assembly includes a rotating component, a turbine engine component and a lubrication system. The lubrication system is adapted to lubricate the turbine engine component where the rotating component rotates a first direction about an axis. The lubrication system is also adapted to lubricate the turbine engine component where the rotating component rotates a second direction about the axis.

According to another aspect of the invention, an assembly is provided for a rotational system that includes a rotating component. This assembly includes a lubrication system and a bearing adapted to support the rotating component. The lubrication system is adapted to lubricate the bearing where the rotating component rotates a first direction about an axis. The lubrication system is also adapted to lubricate the bearing where the rotating component rotates a second direction about the axis.

According to still another aspect of the invention, a method is provided involving a bearing and a rotating component of a turbine engine. The method includes a step of lubricating the bearing where the rotating component rotates a reverse direction about an axis. The bearing supports the rotating component. The rotating component is operable to rotate a forward direction and the reverse direction about the axis.

The first direction may be a forward direction. The second direction may be a reverse direction. Alternatively, the first direction may be a reverse direction. The second direction may be a forward direction.

The turbine engine component may be configured as or otherwise include a bearing adapted to support the rotating component. This bearing may be configured as a journal bearing or any other type of bearing.

The rotating component may be configured as or otherwise include a gear or a shaft.

The assembly may include a fan rotor, a compressor rotor and a gear train. The gear train may be connected between the fan rotor and the compressor rotor. The gear train may include the rotating component and the turbine engine component.

The lubrication system may include a first pump adapted to direct lubricant to the turbine engine component where the rotating component rotates the first direction. The lubrication may also or alternatively include a second pump adapted to direct lubricant to the turbine engine component where the rotating component rotates the second direction.

The lubrication system may include a first pump adapted to direct lubricant to the bearing where the rotating component rotates the first direction. The lubrication system may also or alternatively include a second pump adapted to direct lubricant to the bearing where the rotating component rotates the second direction.

The first pump may be adapted to direct lubricant to the second pump where the rotating component rotates the first direction. The second pump may also or alternatively be adapted to direct lubricant to the first pump where the rotating component rotates the second direction.

The lubrication system may include a first lubricant reservoir fluidly coupled with the first pump. The lubrication system may also include a second lubrication reservoir fluidly coupled with the second pump.

The first pump may be adapted to be driven by torque from a shaft of the rotational system. The second pump may be adapted to be driven by the torque from the shaft of the rotational system.

The lubrication system may include a first lubrication circuit adapted to direct lubricant to the bearing where the rotating component rotates the first direction. The lubrication system may also or alternatively include a second lubrication circuit adapted to direct lubricant to the bearing, independent of the first lubricant circuit, where the rotating component rotates the second direction.

The first lubrication circuit may include a first pump. In addition or alternatively, the second lubrication circuit may include a second pump.

The first lubrication circuit may be adapted to lubricate the first pump where the rotating component rotates the first direction. The second lubricant circuit may also or alternatively be adapted to lubricate the second pump where the rotating component rotates the second direction.

The bearing may be configured as or otherwise include a journal bearing.

The bearing may rotate the reverse direction where a rotor of the turbine engine is windmilling.

The method may include lubricating the bearing where the rotating component rotates the forward direction about the axis.

The lubricating of the bearing may include directing lubricant to the bearing using a pump driven by torque from a shaft of the turbine engine.

The foregoing features and the operation of the invention will become more apparent in light of the following description and the accompanying drawings.

DETAILED DESCRIPTION OF THE INVENTION

Figure 1:
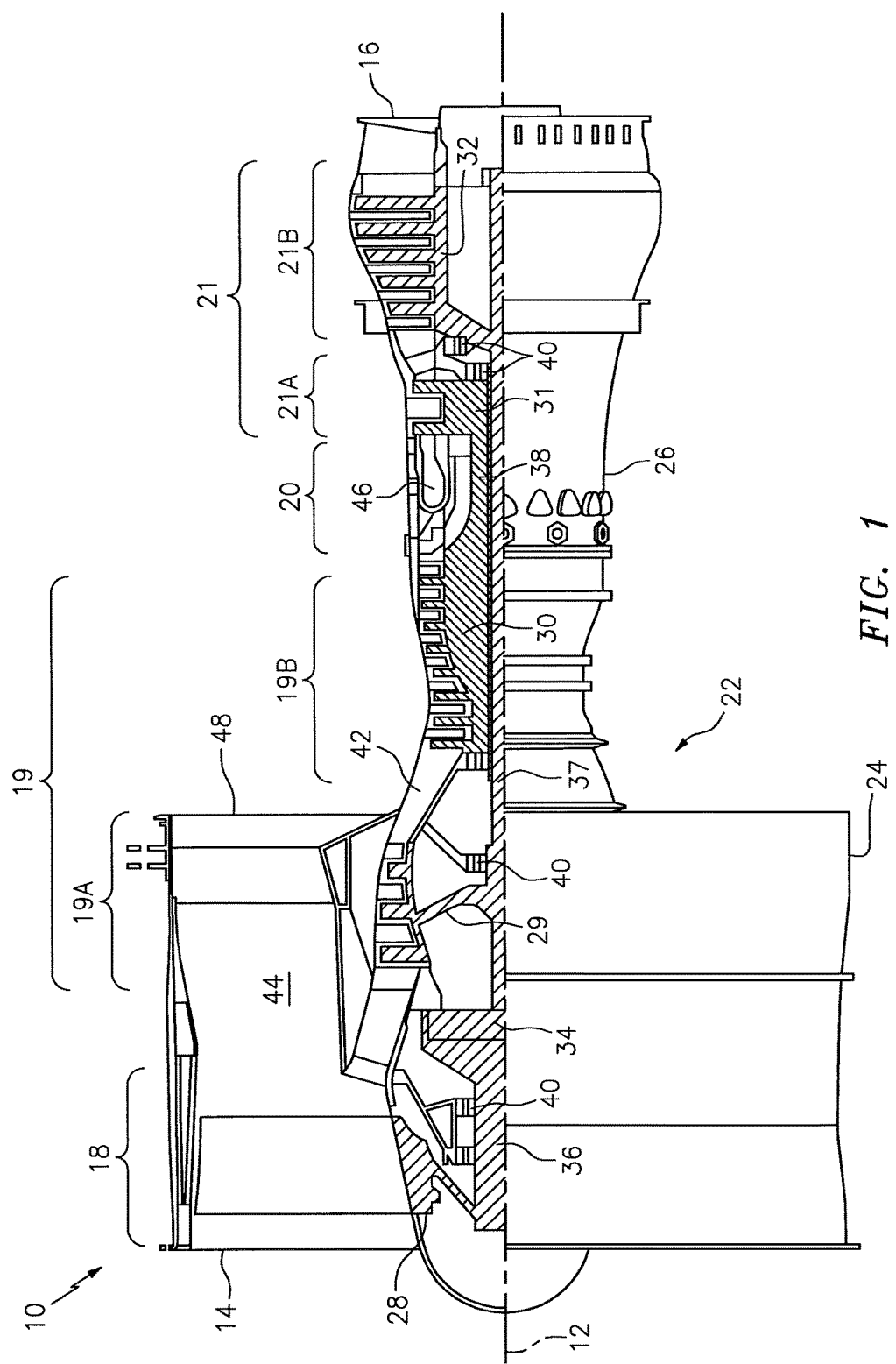
FIG. 1 is a side cutaway illustration of a turbine engine.

FIG. 1 is a side cutaway illustration of a turbine engine 10. This turbine engine 10 is configured as a geared turbofan engine and may be included in an aircraft propulsion system.

The turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B. The engine sections 18-21 are arranged sequentially along the centerline 12 within a housing 22, which includes a first engine case 24 and a second engine case 26.

Each of the engine sections 18-19B, 21A and 21B includes a respective rotor 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is connected to a gear train 34, for example, through a fan shaft 36. The gear train 34 and the LPC rotor 29 are connected to and driven by the LPT rotor 32 through a low speed shaft 37. The HPC rotor 30 is connected to and driven by the HPT rotor 31 through a high speed shaft 38. The shafts 36-38 are rotatably supported by a plurality of bearings 40; e.g., rolling element and/or thrust bearings. Each of these bearings 40 is connected to the second engine case 26 by at least one stationary structure such as, for example, an annular support strut.

During operation, air enters the turbine engine 10 through the airflow inlet 14, and is directed through the fan section 18 and into a core gas path 42 and a bypass gas path 44. The air within the core gas path 42 may be referred to as "core air". The air within the bypass gas path 44 may be referred to as "bypass air". The core air is directed through the engine sections 19-21 and exits the turbine engine 10 through the airflow exhaust 16 to provide forward engine thrust. Within the combustor section 20, fuel is injected into a combustion chamber 46 and mixed with the core air. This fuel-core air mixture is ignited to power the turbine engine 10. The bypass air is directed through the bypass gas path 44 and out of the turbine engine 10 through a bypass nozzle 48 to provide additional forward engine thrust. Alternatively, at least some of the bypass air may be directed out of the turbine engine 10 through a thrust reverser to provide reverse engine thrust.

Figure 2:
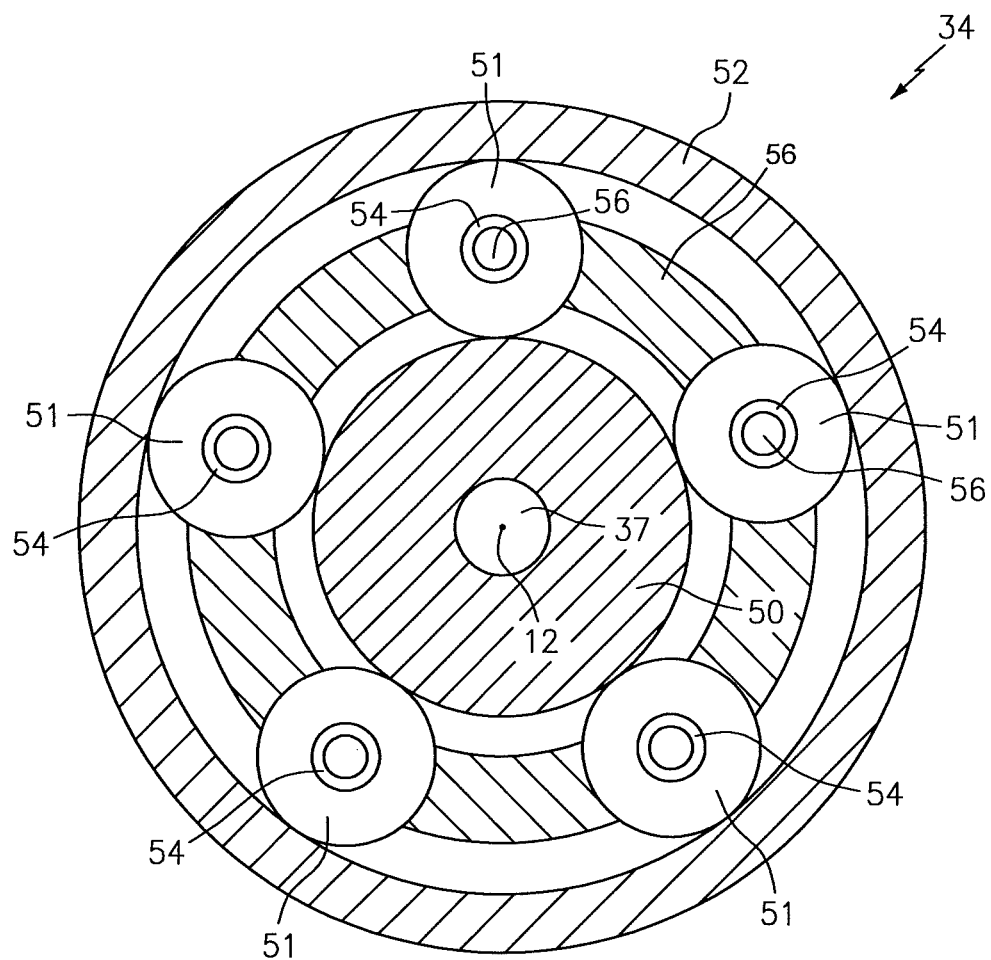
FIG. 2 is a cross-sectional illustration of a gear train for the turbine engine of FIG. 1.

FIG. 2 illustrates an exemplary embodiment of the gear train 34. This gear train 34 includes a sun gear 50, a plurality of star gears 51, a plurality of bearings 54 (e.g., journal bearings), and a ring gear 52. The sun gear 50 is rotatable about the centerline 12. The sun gear 50 is connected to the low speed shaft 37, for example, through a joint such as a spline joint. The star gears 51 are arranged circumferentially around the centerline 12 and radially meshed between the sun gear 50 and the ring gear 52. Each of the star gears 51 is rotatable about a respective axis. Each of the star gears 51, for example, is rotatably connected to a stationary gear carrier 56 through a respective one of the bearings 54. The gear carrier 56 may be connected to the second engine case 26 (see FIG. 1) through a support strut and/or a flexible support. The ring gear 52 is rotatable about the centerline 12. The ring gear 52 is connected to the fan shaft 36 (see FIG. 1), for example, through a joint such as a bolted flange joint.

Figure 3:
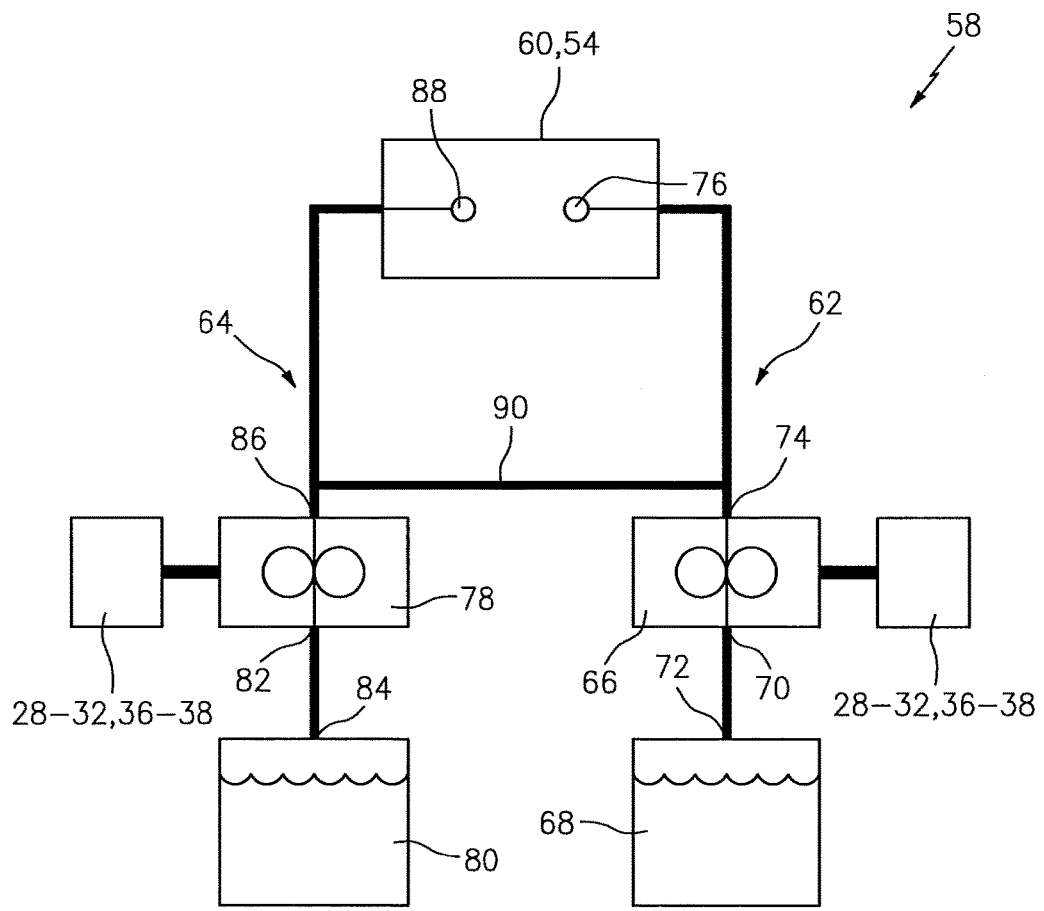
FIG. 3 is a block diagram of a lubrication system for the turbine engine of FIG. 1.

FIG. 3 illustrates a system 58 for lubricating at least one component 60 of the turbine engine 10 of FIG. 1. The turbine engine component 60 is described below and illustrated in FIG. 3 as one of the bearings 54 (see FIG. 2) for ease of description. However, in alternative embodiments, the lubrication system 58 may also or alternatively lubricate at least one of the gears 50-52 (see FIG. 2), at least one of the bearings 40 (see FIG. 1), and/or any other moving component(s) of the turbine engine 10.

The lubrication system 58 of FIG. 3 includes a primary lubrication circuit 62, which lubricates the bearing 54 during forward rotation. The lubrication system 58 also includes a secondary lubrication circuit 64, which lubricates the bearing 54 during reverse rotation independent of the primary lubrication circuit 62. The term "forward rotation" may describe a (e.g., clockwise) direction a respective rotating component rotates about an axis when the turbine engine 10 is powered up. The term "reverse rotation" may describe an opposite (e.g., counter-clockwise) direction a respective rotating component rotates about an axis when the turbine engine 10 is powered down; e.g., during windmilling. An example of a rotating component is the star gear 51 that is rotatably supported by the respective bearing 54. Other examples of rotating components include, but are not limited to, the gears 50 and 52, the rotors 28-32, and the engine shafts 36-38.

The primary lubrication circuit 62 includes a forward rotation pump 66 and a primary lubricant reservoir 68 such as, for example, a gutter, a sump or a tank. The forward rotation pump 66 may be configured as a mechanically driven positive displacement pump. The forward rotation pump 66 may be rotationally coupled to and driven by torque from a rotating component of the turbine engine; e.g., the low speed shaft 31.

The forward rotation pump 66 is fluidly coupled inline between the primary lubricant reservoir 68 and the bearing 54. For example, a first inlet/outlet 70 (I/O) of the forward rotation pump 66 may be fluidly coupled with an inlet/outlet 72 (I/O) of the primary lubricant reservoir 68. A second inlet/outlet 74 (I/O) of the forward rotation pump 66 may be fluidly coupled with at least one first orifice 76 in the bearing 54.

The secondary lubrication circuit 64 includes a reverse rotation pump 78 and a secondary lubricant reservoir 80 such as, for example, a gutter, a sump or a tank. The reverse rotation pump 78 may be configured as a mechanically driven positive displacement pump. The reverse rotation pump 78 may be rotationally coupled to and driven by torque from a rotating component of the turbine engine; e.g., the low speed shaft 31.

The reverse rotation pump 78 is fluidly coupled inline between the secondary lubricant reservoir 80 and the bearing 54. For example, a first inlet/outlet 82 (I/O) of the reverse rotation pump 78 may be fluidly coupled with an inlet/outlet 84 (I/O) of the secondary lubricant reservoir 80. A second inlet/outlet 86 (I/O) of the reverse rotation pump 78 may be fluidly coupled with at least one second orifice 88 in the bearing 54, which orifice 88 is discrete from the first orifice 76. The second inlet/outlet 86 may also be fluidly coupled with the second inlet/outlet 74 through, for example, a conduit 90.

Figure 4:
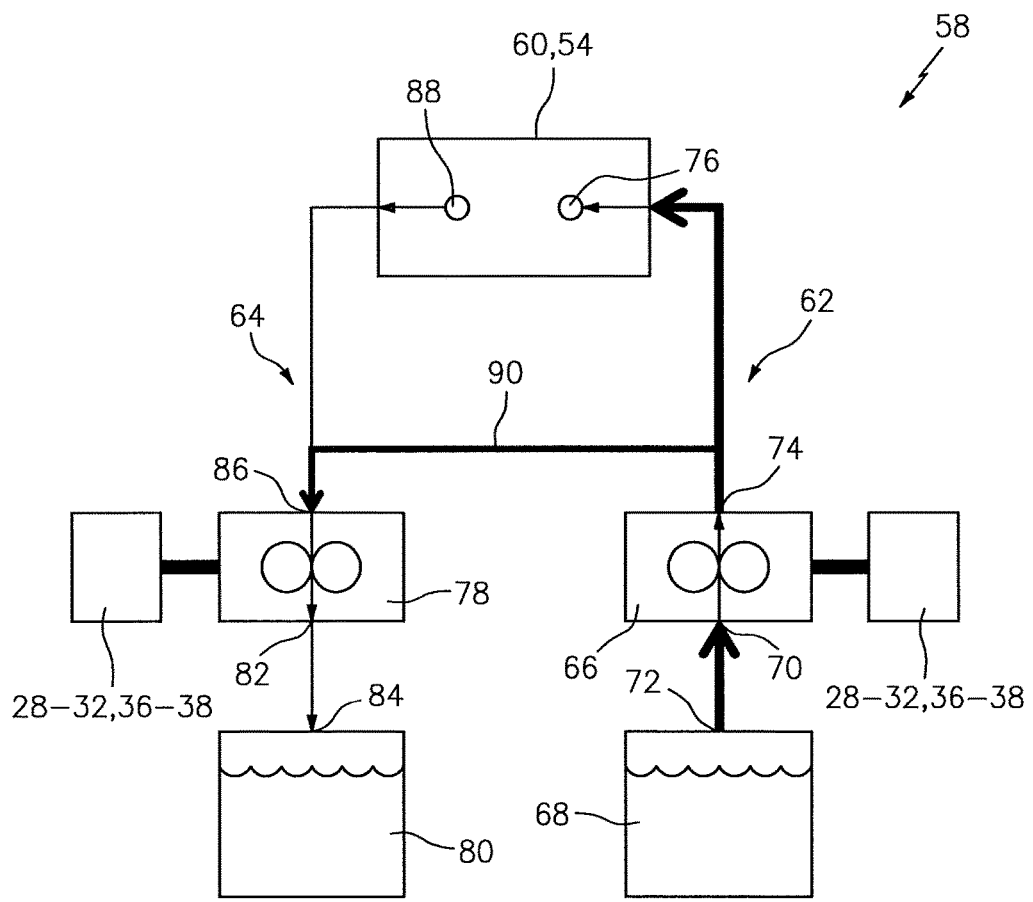
FIG. 4 is a block diagram of the lubrication system of FIG. 3 during forward rotation operation.

Referring to FIG. 4, during forward rotation operation, the forward rotation pump 66 directs lubricant (e.g., oil) from the primary lubricant reservoir 68 to the first orifice 76 thereby lubricating the bearing 54. This lubricant may subsequently be provided to the meshing surfaces of the gears 50-52 (see FIG. 2) thereby lubricating the gears 50-52. The forward rotation pump 66 may also direct the lubricant to the second inlet/outlet 86 thereby lubricating the reverse rotation pump 78. The reverse rotation pump 78 (if engaged and operational), in contrast, may siphon air (and sometimes a small quantity of lubricant) from the second orifice 88 and direct this air into the secondary lubricant reservoir 80. This suction may also aid in directing the lubricant through the conduit 90 from the forward rotation pump 66.

Figure 5:
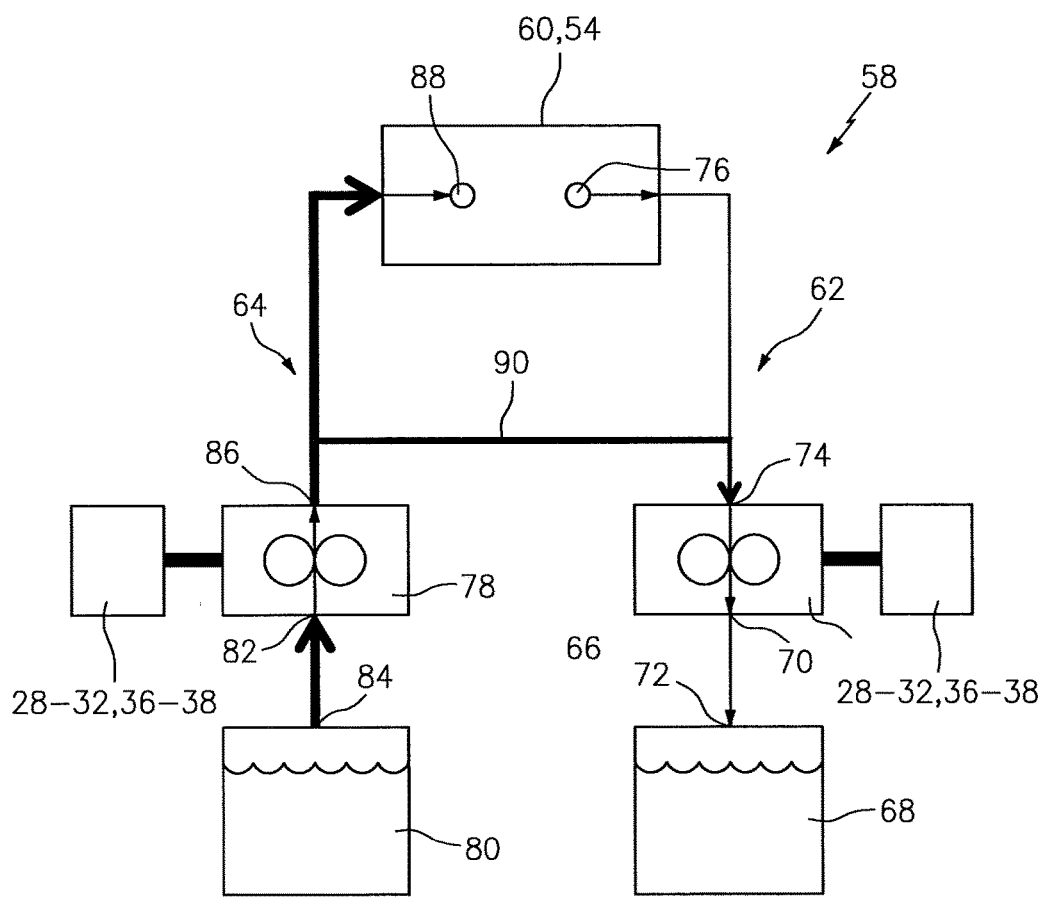
FIG. 5 is a block diagram of the lubrication system of FIG. 3 during reverse rotation operation.

Referring to FIG. 5, during reverse rotation operation, the reverse rotation pump 78 directs lubricant (e.g., oil) from the secondary lubricant reservoir 80 to the second orifice 88 thereby lubricating the bearing 54. This lubricant may subsequently be provided to the meshing surfaces of the gears 50-52 (see FIG. 2) thereby lubricating the gears 50-52. The reverse rotation pump 78 may also direct the lubricant to the second inlet/outlet 74 thereby lubricating the forward rotation pump 66. The forward rotation pump 66 (if engaged and operational), in contrast, may siphon air (and sometimes a small quantity of lubricant) from the first orifice 76 and direct this air into the primary lubricant reservoir 68. This suction may also aid in directing the lubricant through the conduit 90 from the reverse rotation pump 78.

As described above in the background section, a prior art turbine engine may include a mechanical rotor locking device to prevent rotation of its rotors since its components are not lubricated during reverse rotation. The lubrication system 58 of FIG. 5, in contrast, can accommodate reverse rotation operation with its secondary lubrication circuit 64. The secondary lubrication circuit 64 therefore may provide a failsafe feature that prevents or reduces engine damage if its rotor locking device fails. The secondary lubrication circuit 64 may also enable the turbine engine 10 to be configured without a rotor locking device.

The lubrication system 58 may have various configurations other than that described above and illustrated in the drawings. For example, the forward rotation pump 66 may be configured with a higher pump flow rate than the reverse rotation pump 78. The primary lubricant reservoir 68 may be configured with a higher lubricant holding capacity than the secondary lubricant reservoir 80. The primary lubricant reservoir 68 and the secondary lubricant reservoir 80 may be fluidly coupled together, for example, by a conduit. One of the lubricant reservoirs 68 and 80 may be omitted and both pumps 66 and 78 may be fluidly coupled to a common lubricant reservoir (e.g., the remaining reservoir). The conduit 90 may be omitted where, for example, the pumps 66 and 78 are lubricated by another lubrication system or sub-system of the lubrication system 58. The present invention therefore is not limited to any particular lubrication system configurations.

The lubrication system 58 may be included in various turbine engines other than the one described above as well as in other types of rotational systems. The lubrication system 58, for example, may be included in a geared turbine engine where a gear train connects one or more shafts to one or more rotors in a fan section, a compressor section and/or any other engine section. Alternatively, the lubrication system 58 may be included in a turbine engine configured without a gear train. The lubrication system 58 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines or rotational systems.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a rotational system that includes a rotating component, the assembly comprising:
   a bearing adapted to support the rotating component; and
   a lubrication system adapted to lubricate the bearing where the rotating component rotates a first direction about an axis, and adapted to lubricate the bearing where the rotating component rotates a second direction about the axis;
   wherein the lubrication system comprises
      a first pump adapted to direct lubricant to the bearing where the rotating component rotates the first direction; and
      a second pump adapted to direct lubricant to the bearing where the rotating component rotates the second direction;
      wherein the first pump is adapted to direct lubricant to the second pump where the rotating component rotates the first direction.

2. The assembly of claim 1, wherein the second pump is adapted to direct lubricant to the first pump where the rotating component rotates the second direction.

3. The assembly of claim 1, wherein the lubrication system comprises
   a first lubricant reservoir fluidly coupled with the first pump; and
   a second lubrication reservoir fluidly coupled with the second pump.

4. The assembly of claim 1, wherein
the first pump is adapted to be driven by torque from a shaft of the rotational system; and
the second pump is adapted to be driven by the torque from the shaft of the rotational system.

5. The assembly of claim 1, wherein the bearing comprises a journal bearing.

6. The assembly of claim 1, further comprising:
a fan rotor;
a compressor rotor; and
a gear train connected between the fan rotor and the compressor rotor, the gear train including the bearing.

7. The assembly of claim 1, wherein the rotational system comprises a turbine engine.

8. An assembly for a rotational system that includes a rotating component, the assembly comprising:
a bearing adapted to support the rotating component; and
a lubrication system adapted to lubricate the bearing where the rotating component rotates a first direction about an axis, and adapted to lubricate the bearing where the rotating component rotates a second direction about the axis;
wherein the lubrication system comprises
a first lubrication circuit adapted to direct lubricant to the bearing where the rotating component rotates the first direction; and
a second lubrication circuit adapted to direct lubricant to the bearing, independent of the first lubricant circuit, where the rotating component rotates the second direction.

9. The assembly of claim 8, wherein
the first lubrication circuit comprises a first pump; and
the second lubrication circuit comprises a second pump.

10. The assembly of claim 9, wherein the first lubrication circuit is adapted to lubricate the first pump where the rotating component rotates the first direction.

11. The assembly of claim 10, wherein the second lubricant circuit is adapted to lubricate the second pump where the rotating component rotates the second direction.

12. The assembly of claim 8, further comprising:
a fan rotor;
a compressor rotor; and
a gear train connected between the fan rotor and the compressor rotor, the gear train including the bearing.

13. The assembly of claim 8, wherein the rotational system comprises a turbine engine.

14. The assembly of claim 8, wherein the bearing comprises a journal bearing.

15. A method involving a bearing and a rotating component of a turbine engine, the method comprising:
lubricating the bearing where the rotating component rotates a reverse direction about an axis;
wherein the bearing supports the rotating component, and the rotating component is operable to rotate a forward direction and the reverse direction about the axis; and
wherein the rotating component rotates the reverse direction where a rotor of the turbine engine is windmilling.

16. The method of claim 15, further comprising lubricating the bearing where the rotating component rotates the forward direction about the axis.

17. The method of claim 15, wherein the lubricating of the bearing comprises directing lubricant to the bearing using a pump driven by torque from a shaft of the turbine engine.

18. The method of claim 15, wherein the bearing comprises a journal bearing.

* * * * *